United States Patent [19]
Miller

[11] 4,125,798
[45] Nov. 14, 1978

[54] METHOD AND MEANS FOR LOCATING PROCESS POINTS ON MINIATURIZED CIRCUITS

[76] Inventor: C. Fredrick Miller, 2165 N. Glassell, Orange, Calif. 92667

[21] Appl. No.: 786,253

[22] Filed: Apr. 11, 1977

[51] Int. Cl.² .................................................. G05B 19/22
[52] U.S. Cl. ................................... 318/574; 318/603; 318/685; 364/474
[58] Field of Search .............. 318/685, 574, 575, 603; 364/474, 475, 476

[56] References Cited

U.S. PATENT DOCUMENTS

| | | | |
|---|---|---|---|
| 3,466,514 | 9/1969 | Brunner et al. | 318/577 |
| 3,548,281 | 12/1970 | Anis | 318/685 X |
| 3,585,480 | 6/1971 | Kirkpatrick | 318/603 |
| 3,622,856 | 11/1971 | Willis | 318/640 |
| 3,786,332 | 1/1974 | Hepner et al. | 318/577 |
| 3,889,164 | 6/1975 | Nishizawa et al. | 318/577 |
| 3,955,072 | 5/1976 | Johannsmeier | 318/685 X |

*Primary Examiner*—B. Dobeck
*Attorney, Agent, or Firm*—Grover A. Frater

[57] ABSTRACT

A method and an apparatus is provided by which automatic or semi-automatic processing of integrated and printed circuit devices can be accomplished notwithstanding that the points at which processing must be accomplished have been displaced from their assigned positions by translation and rotation. The method involves measurement of displacement of some circuit points from their designated positions in a specified sequence. That is coupled with a physical positioning and orientation of the device relative to the process apparatus and with approximate calculation. An apparatus is disclosed by which the measurements, sequence of measurements, orientation, and computation required can be accomplished.

14 Claims, 9 Drawing Figures

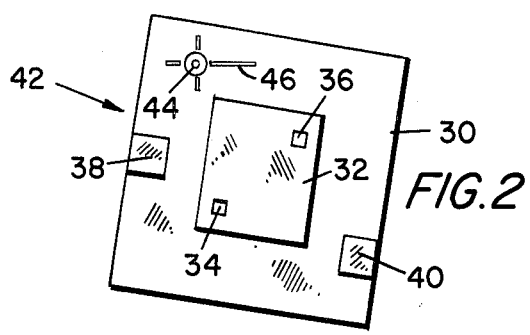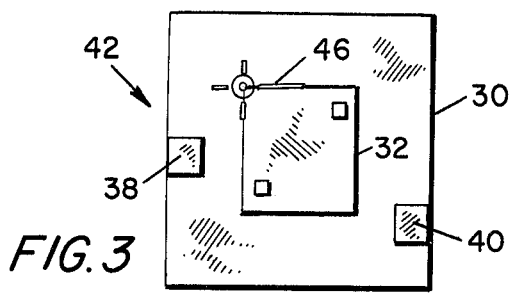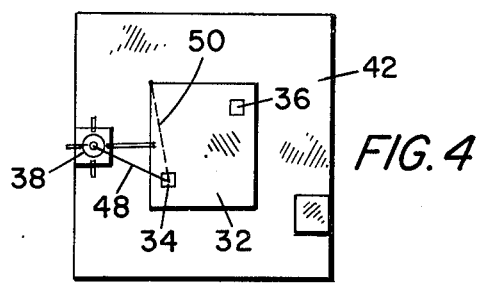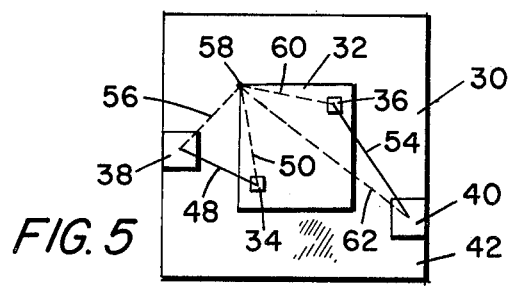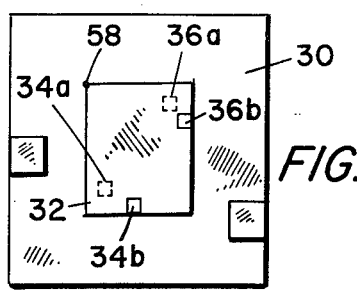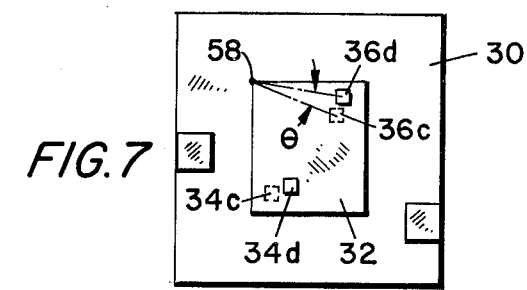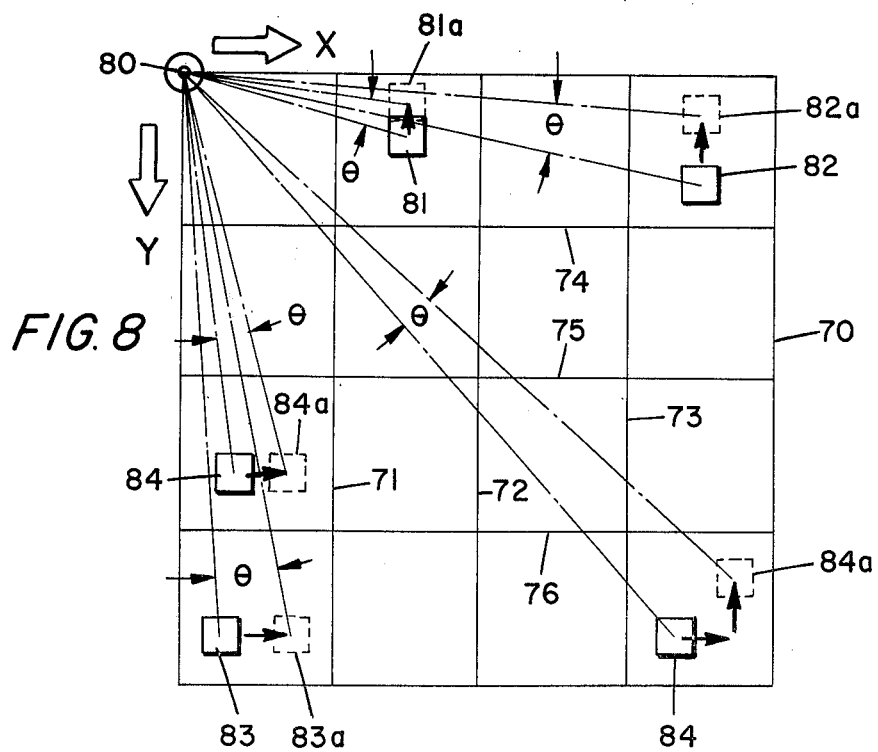

METHOD AND MEANS FOR LOCATING PROCESS POINTS ON MINIATURIZED CIRCUITS

This invention relates to improvements in methods and means for locating the position of processing points in miniaturized electronic circuit elements.

BACKGROUND OF THE INVENTION

In the production of microelectronic devices, especially printed and integrated circuitry, it is necessary to conduct a series of process steps at predefined points on the surface of the device. The pattern of movement of test probes and wire bonding tools, or other process apparatus, over the surface to reach those defined points is repeated in the case of each device. It is current practice to automate the process tool movement in mass producing such devices. Other steps in the production process are also automated, including the steps in which such "predefined points" are produced. It is not unusual that manufacturing variations result in displacement of the component, including those process points, and that gives rise to the need for some means to detect and overcome displacement errors so that automatic processing can continue.

An example of the problem is found in the manufacture of integrated circuit devices where the circuit is formed on a substrate, the substrate is mounted on a base, and the base is mounted in or on a housing in common with external connector elements. A device constructed in that fashion is illustrated in FIG. 1 of the accompanying drawing. A fourteen-pin integrated circuit device is shown in a partially completed "DIP" package. The circuit includes a number of wire bonding pads which are connected by fine conductor wires to the inner ends of respectively associated connector pins. Those wires are added to the unit by a bonding machine that bonds an end of a wire to a pad in the circuit and leads the wire to the inner end of one of the connector pins. The machine bonds the wire to that connector and then severs the standing part of the wire. That process is repeated over and over until all of the wire connectors are completed one at a time.

The minimum wire size, and the smallest bonding tools, that can be used successfully in the current state of automated integrated circuit production, results in bonds whose areas cover several square mils. As designers add more and more elements to integrated circuits, and attempt to fit them into existing packages, the area allocated to bonding pads is reduced. Pad area may be only a few square mils. The fact that the bond area approaches the pad area poses a problem if the pad is displaced from its assigned position. If the pad is displaced by distances in the order of 1 or 2 mils, the automatic bonding process may produce defective bonds and may even produce short circuits and improper connections to circuit points adjacent to the bonding pads.

The process by which printed and integrated circuits are produced results in a high degree of uniformity in the surface geometry between the individual pieces resulting from continuous or lot production. Thus, little variation is found in the relative positions of circuit pads and test points on integrated circuit substrates or chips. However, it is not at all uncommon to find variations in placement of the circuit on the substrate, in placement of the substrate on the base, and in placement of the base relative of the connector pins. That there is ample opportunity for such variation will be apparent from an examination in FIG. 1.

Placement error can be categorized as lineal translations and angular displacements common to all of the test and bond points of the circuit. Displacement errors which involve no angular displacement and are limited to lineal translation are relatively easy to overcome. In such a case, the direction and amount of correction required at any one process point of the circuit is required at all process points of that circuit. It is usually a relatively simple matter to alter an automatic processing program to apply a uniform correction when locating process points. It is necessary to interrupt automatic processing to measure displacement at one point, but once that has been accomplished, processing can be automatic.

Correcting angular displacement is not so simple. The amount of lineal displacement at each process point, as a consequence of rotational translation, is a function of the position of the center of rotational displacement and of the angle of displacement. The difficulty is greatly compounded when rotational displacement is combined with translational displacement.

Errors can be calculated and compensated for if the direction and the amount of displacement is measured at two or three process points. Trigonometry and arithmetic and geometry can be used to calculate the amount of translation and the degree of rotational displacement. Having that information, trigonometry, arithmetic and geometry can be used to calculate the correction required at each process point. The calculation can be accomplished using a computer. However, it is required to employ trigonometric functions and identities and to employ geometric formulas. Trigonometric tables must be stored or computed and identities and formulas must be stored or derived. Further, the computation of each process point may require a number of conversions from rectangular to polar coordinates and back again. The result is slow computation and slow processing, unless a large computer is employed. Large computers are expensive and it is not uncommon to resort to time sharing techniques and the complication they introduce to permit the employment of greater computer power.

SUMMARY OF THE INVENTION

It is an object of this invention to provide an improved method for finding the position of displayed process points and a means for practicing that method. It is an object to provide a method that is simple to practice, that can be practiced rapidly, and which finds the position of displaced process points with a degree of accuracy that can be adjusted to any required degree. The method of the invention avoids the need for computing position according to rigorous trigonometric and geometric laws. It combines some physical positioning and orientation of the device to be produced with predefinition of location of process points and with some approximate calculating that is easily accomplished by machine.

Another object is to provide an apparatus by which the method of the invention may be practiced. A "home" position is defined on the substrate or base of the device to be processed. The home position will serve as the origin for a rectangular coordinate grid system. Processing is accomplished on one of the exposed surfaces of the device and the grid system is defined in the plane of that surface. Any point in the plane that is fixed relative to the device can be designated home position, and any two mutually perpendicular directions in that plane are designated X and Y directions. The location of each process point whose location must be known is then defined in terms of its X and Y coordinates to create a grid map which need be no more than a compilation of the coordinates of the several process points.

To find the location of the corresponding points on individual samples of the device, the sample is first positioned and rotationally oriented, so that its home position lies at the origin of the previously defined grid and so that the X direction or the Y direction on the device is coincident with the corresponding direction on the grid. Thereafter, the position of a first one of the process points on the device is compared to the position of the corresponding point on the map. The displacement of the process point on the chip from the corresponding map point is then defined in terms of X distance and Y distance.

The assumption is made, without regard to its accuracy, that the displacement, if any, of that first process point is the result of translation of the point from the home position rather than from rotational displacement. All process points on the device are assumed to be displaced from their assigned grid positions in the X and Y directions as was the first point and to lie at a "redefined position." In predicting the actual location of any other process point, the origin can be shifted, or, alternately, the correction can be made at the process points individually. The correction having been made in one of those forms so that the expected grid position of a second process point has been redefined, its redefined position is compared to the position at which it is actually found. Any displacement of the second process point from its redefined expected grid position is assumed to be caused by rotational error and that the rotation axis about which that error was generated is located at the home position. That assumption is made without regard to its truth.

The second process point, being displaced from its redefined position by angular rotation about home position, all points other than the first point, at which all error was assumed to be translational, are displaced from their redefined positions through the same angle. The amount of the displacement of any point caused by such angular rotation is proportional to the angle and the distance of the point from home position. In practice, the angle will be relatively small. It will be so small that the sine and tangent functions can be assumed to be equal and linear with angle. On that assumption, the lineal displacement of any point that is rotationally displaced from its redefined position will be equal to the sine or tangent of the displacement angle times its distance from the home position.

If the second point, the point at which displacement is assumed to result from rotation, lies in the X direction from the home position, then the displacement occurs substantially only in the Y direction. Moreover, the magnitude of the Y displacement varies directly with the value of the X coordinate of the point. That is true even if the point whose Y displacement is being found does not lie in the X direction from the origin or home position. The relationship is true for any point whatever the value of its Y coordinate. It follows, in the case of rotational displacement from redefined position, that the amount of correction required, $\Delta Y_n$, at any point $n$ is approximately equal to the sine or tangent of the angle $\theta$ of rotational displacement times the value of the defined X coordinate $X_r$. Thus:

$$\Delta Y_n = \sin \theta \cdot X_r = \tan \theta \cdot X_r \qquad (1)$$

therefore, $$\Delta X_n = \sin \theta \cdot Y_r = \tan \theta \cdot Y_r \qquad (2)$$

If the amount of lineal translation in X, found at the first point, is $\Delta X_t$, and if the lineal translation in Y, found at the first point, is $\Delta Y_t$; then:

$$X_r = X + \Delta X_t \text{ and } Y_r = Y + \alpha Y_t \qquad (3)$$

and the position of any point, other than the first, will be at:

$$X \text{ actual} = X + \Delta X_t + \tan \theta \, (Y + \Delta Y_t); \qquad (4) \text{ and}$$

$$Y \text{ actual} = Y + \Delta Y_t + \tan \theta \, (X + \Delta X_t) \qquad (5)$$

That relationship requires that $\Delta X_t$ and $\Delta Y_t$ be measured before $\theta$ is measured. In some cases, where $\sin \theta$ and $\Delta X_t$ and $\Delta Y_t$ are small, it is sufficiently accurate to simplify these expressions to:

$$X \text{ actual} = X + \Delta X_t + \tan \theta \, Y$$

$$Y \text{ actual} = Y + \Delta Y_t + \tan \theta \, X$$

It is possible to measure $\theta$ by rotating the workpiece about the origin to overcome the rotational error at the second point. If the second point lies on or substantially on the X axis, $\theta$ can be measured by measuring the Y displacement. If the second point lies on or substantially on the Y axis, $\theta$ can be measured by measuring the X displacement. These alternatives can be accomplished in a number of ways, a preferred one of which is to measure steps in a stepping motor used to rotate the work in the case of the first alternative and used to move the work in X and Y, respectively, in the case of the other two alternatives. The displacement found at the second point in the latter two of those procedures is the value of the term $\tan \theta \, X$ or $\tan \theta \, Y$. Dividing by X or Y computes $\tan \theta$.

If one has a small computer capacity available, X and Y direction measurements made as displacement is corrected at the second point at any point whether or not it lies on the X or Y axis can be used to determine $\tan \theta$. The step of compensating for X and Y translation at the first point greatly simplifies the calculation with little loss of accuracy. However, it is less cumbersome to use one of the three alternatives described above.

The magnitude of the angle whose tangent is to be employed in the equation need not actually be found. By way of example, if the angle is measured by rotation of the workpiece, it can be expressed in digital form as a number of steps of the stepping motor. If measured as X or Y displacement at a point near the Y or X axis, it can be expressed as a number of steps of the X or Y drive motor divided by X or Y. The latter is simplified in automatic processing because the coordinates of all processing points are stored in a memory unit of some kind.

A further simplification is possible if the magnitude of X and Y correction for rotational displacement is expressed as the product of some small unit of angular rotation and the mid-value of a range of X values and Y values. That is done by arranging the grid map in columns of X values and rows of Y values to define squares. Every process point that falls in the same column is assigned the same X coordinate value corresponding, in preferred arrangement, to the mid-value of X in that column. That is done for each column and a Y value is assigned in like fashion to each row. The X values and Y values thus found are multiplied in a preferred form of the invention by the small unit of angular rotation mentioned above. The products of those multiplications are assigned as multiplication factors in X and Y to each square of the grid. To find the magnitude of displacement correction to be applied to the revised position of any process point, it is necessary only to multiply the number of units of angular displacement by the X and Y multipliers of the grid square or area in which the process point is located.

An apparatus that will permit practice of the process so described includes a means for forming a grid map in rectangular coordinates of expected process point positions or a record of those positions relative to an origin and a predefined X or Y direction. It matters not which direction is labelled X or is labelled Y. That apparatus is coupled with a means for altering the expected point positions individually or by altering the position of the origin in the map or record of positions. A means is provided for measuring any translation of one process point from its expected position and for measuring the amount of translation and the X, Y components of such translations. Further, a means is provided for performing a mathmatical operation on the information provided by other components of the apparatus.

It is not essential to successful practice of the invention, but practice will be greatly facilitated if home position is selected so that all process points lie in the same rectangular coordinate quadrant from that home position.

DRAWINGS

In the drawings:

FIGS. 2 through 8 are diagrams illustrating the method of the invention and why the method provides the desired result.

EXPLANATION AND DESCRIPTION OF PREFERRED MODE FOR PRACTICING INVENTION

Figure 1:
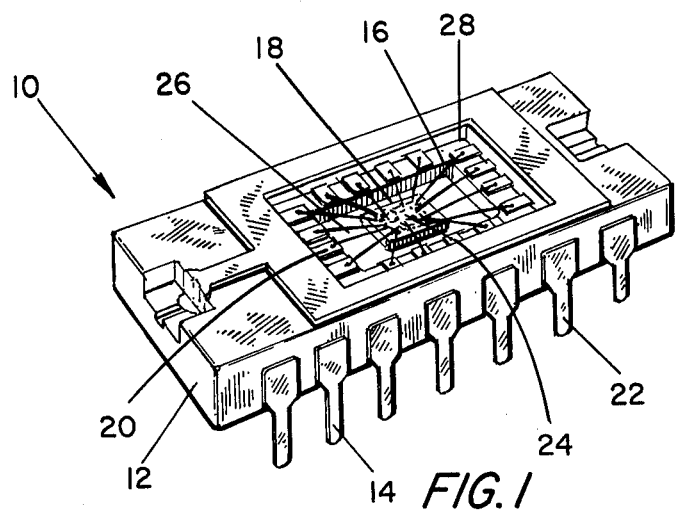
FIG. 1 is a perspective view of an integrated circuit device shown prior to addition of its outer package.

FIG. 1 shows a fourteen-pin integrated circuit device which is complete except for application of an encapsulating plastic housing. The device is designated generally by the reference numeral 10. Its fourteen connector pins extend downwardly in two row, one on either side of the body 12 of the device. The inner ends of the pins, one of which is identified by the reference numeral 14, extend into the body where they are exposed at the upper surface and are spaced around a substrate 18 of semiconductor material. The substrate is mounted on a base 16. Each of the connector pins terminates at an inner end which is located closely adjacent to the base 16. By way of example, pin 14 terminates in an inner end 20 and terminal 22 terminates in an inner end 24. In this example, an integrated circuit is formed on the upper surface of the substrate 18. The individual parts of that circuit are so small as to be indistinguishable even in the enlarged scale employed in FIG. 1. Accordingly, no attempt has been made to show any portion of the integrated circuit other than the fourteen bonding pads by which the integrated circuitry is interconnected with the fourteen connector pins. Even those pads are shown enlarged, because, in a representative actual device, they have an area which is somewhere between 4 and 16 square mils.

Bridging wires interconnect those several bonding pads with respectively associated ones of the inner ends of the pin connectors. Thus, for example, the inner end 20 of pin connector 14 is connected to one of the pads in the circuit by a connector wire 26 which, in a typical case, may have a diameter of one mil or less.

In the example shown, the base 16 is mounted upon a sub base 28 and the inner ends of several pin connectors are formed so that they lie flat upon the surface of that sub base 28.

Installation of the wires that interconnect the circuit pads with the connector pins is accomplished with a wire bonding machine. A number of forms of such machines are well known and are described in the patent literature. Although other processes are used, most wire bonding machines employ thermal compression or sonic welding. They include wire feed mechanisms and wiring severing mechanisms. In some cases, they include a means for melting the ends of wires so that a ball will be formed. In the operation of such bonding machines, the end of the wire to be bonded and the bonding tool must be placed directly upon the bonding pad of the integrated circuit. The bond having completed, the machine must move the tool or the work so that the wire and the tool overlie a point on the inner end of a pin terminal at the point at which the other end of the wire is to be bonded. The integrated circuits and their pads, the wires, and the tool, are so small that they must be viewed through a microscope if the tool is to be properly placed over a bond point. It is almost universal practice to include a target or reticle in the optical system of the microscope so that the operator of the bonding machine can know where the bonding tool will engage if lowered to the surface of the work. In this connection, not all bonding tools move vertically toward and away from the work piece. Sometimes, the movement is at an angle, and sometimes, the work piece and tool are mounted for relative horizontal movement. However, these several arrangements are equivalent, and since vertical movement is most often employed, the description that follows will employ terms that imply vertical movement in a generic sense to describe all of the arrangements that are employed. During the bonding process, the tool is moved "over" the work. In some bonding machines, movement of the microscope and tool relative to the work piece is possible, but is most machines, once the tool is positioned so that it will engage the work piece at the point indicated by the target or reticle, relative movement between the work piece and the tool and reticle is accomplished by moving the work piece. Whether it is the work piece or the tool that is moved is of little moment in practicing this invention. Accordingly, it will be assumed in the explanation that follows that it is the work piece that is moved, although it is to be understood that that language is intended to describe both a situation in which it is the tool that is moved and the situation in which the work piece is moved.

Bonding can be accomplished manually with most bonding machines, and in the manual process the operator moves the work piece so that a first processsing or bonding point lies under the target. The operator lowers the bonding tool with the wire end and bonds it to one of the conductor pads of the integrated circuit. The operator then lifts the tool and moves the work until the second bonding point is directly under the target. The act of moving the work piece serves to draw out an appropriate length of wire. The operator then lowers the tool and accomplishes bonding of the second point so that the wire now bridges the two bond points. The standing part of the wire is severed to form a new wire end under the tool. The operator moves the work piece until another circuit pad underlies the target. That process is repeated until all of the wires have been installed.

Many of the bonding machines currently available are equipped to accomplish that process automatically. They include a means for moving the work so that the several bond points lie directly under the bonding tool in succession and tool operation at each point is made automatic. Movement of the work piece and tools can be very accurately controlled so that the wire bonding process can proceed automatically without human intervention provided that the bonding pads are located at exactly the positions at which it is intended they will be.

It will be apparent from an examination from FIG. 1 that the area of the inner end of the connector pin is so large that small errors in the relative position of the several parts of the chip will have no effect. However, when the pad size is reduced to an area approaching the area of the bond between that circuit pad and the wire, then errors in component placement that result in displacement of bonding pads by only a few mils can reduce the process to automatic production of defective devices.

Heretofore, only two solutions were available. Automatic production could be abandoned in favor of manual production. However, reduction in bonding pad area makes manual bonding more difficult and slows the process. The other solution, as described above, is to make displacement measurements and employ them in the laborious task of computing the correction required at each of the pads of the circuit.

This invention provides an alternative which can be understood by an examination of FIGS. 2 through 8. While the examples selected for illustration in those figures relates to wire bonding, it is to be understood that the invention is applicable to the determination of the position of process points, whether the processing be wire bonding or something else.

In FIGS. 2 through 7, the numeral 30 represents a base upon which a substrate 32 is mounted. A printed and integrated circuit is formed upon the substrate. Only two portions of that circuit are shown and they are pads to which an electrical connection is to be made. The pad in the lower left-hand corner of the substrate is numbered 34 and the pad in the upper right-hand corner is numbered 36. Pad 34 is to be interconnected with a printed circuit pad 38 at the left of the base 30. The circuit pad 36 of the substrate is to be electrically interconnected with the printed circuit pad 40 of the base. Interconnection of those circuit points will be accomplished by bonding a very fine wire first to the substrate pad and then to the corresponding pad of the base. The structure thus far defined is called a "work piece" and is generally designated 42.

The sunburst figure 44 at the upper left of the work piece includes a circle with a dot in its center and outwardly extending rays one of which is longer than the others and is designated 46. That figure represents a target or reticle that would be seen when looking at work piece 42 through the microscope of a bonding tool. Let it be assumed that some means is provided for moving the work piece relative to the microscope so that it moves relative to the reticle 44. Motion of the work piece in the direction of the long ray 46 is called "motion in the X direction." Motion in the same plane, the plane of the page on which the drawing appears, and perpendicular to the X direction is called the "Y direction." Rotation of the work piece in the X, Y plane is possible, and the degree of rotation is designated $\theta$.

In FIG. 1, the upper left-hand corner of the substrate 32 is displaced in the X and Y directions from the center of the reticle and the edges, in particular the upper edge, of the substrate is displaced rotationally through an angle from the X direction.

That displacement in X, Y and $\theta$ has been overcome in FIG. 3 because the work piece has been moved relative to the reticle so that the upper left-hand corner of the substrate 32 is coincident with the dot at the middle of the reticle and because the upper edge of the substrate is coincident with the ray 46.

To bond a wire to a bonding pad, an operator simply moves the work piece until the pad lies under the center of the reticle of the microscope. The reticle is projected upon the workpiece at the point of action of the bonding tool. An operator, in undertaking to connect a wire 48 from pad 34 to pad 38, would move the workpiece in a combination of X and Y directions such, for example, as indicated by dashed line 50 in FIG. 4 until the reticle was directly over the circuit pad 34. At that point, the operator would employ the tools to bond one end of wire 48 to pad 34. Thereafter, the operator would move the workpiece 42 so that a central point on pad 38 was directly under the reticle as shown in FIG. 4. That having been done, the operator would use the tools to bond the other end of wire 48 to pad 38. FIG. 5 illustrates how the workpiece 42 could be moved relative to a reticle 44 and a bonding tool that did its work under the reticle in a way that would permit interconnecting pad 34 and 38 with the bonding wire 48, and that would interconnect pad 36 with pad 40 with a bonding wire 54. The tool could be moved so that the reticle would appear to move along dotted line 50. The workpiece is then moved so that pad 36 is directly under the reticle. The process is completed by moving the workpiece so that each bond point appears under the target in turn. Alternatively, as shown in FIG. 5, after the first bond had been made at pad 34, the work-piece would be moved in the direction of wire 48 until the center of the reticle was directly over pad 38. After completing a bond at that pad, the operator could move the workpiece so that the reticle appeared to move along a line 56 to bring the reticle back to the initial position which is called the "home" position 58. Thereafter, the operator could move the workpiece so that the reticle appeared to move along dashed line 60 until it was centered over the pad 36. That having been done, the operator would bond one end of wire 54 to pad 36 and then move the workpiece in the direction in which wire 54 is shown to extend until the reticle was centered over pad 40. That having been done, the bonding tool would be used to complete the connection of wire 54 to pad 40. In preparation for working on the next workpiece, the operator would move the reticle back to home position 58 and could do that by moving the workpiece so that the reticle appeared to move along dashed line 62.

If the position of the bonding points on the several pads is specified in terms of X and Y coordinates from some zero reference point such, for example, as the origin or home position 58, it would be possible to use one of the existing wire bonding tools to accomplish automatic motion of the workpiece relative to the tool, and automatic bonding of the wires. Machines are available that can be programmed to perform that same series of operations over and over in a mass production procedure.

FIG. 6 illustrates that the pads can be translated in X and Y directions from their intended or assigned positions. In FIG. 6, the assigned position for the circuit pad corresponding to pad 36 of FIGS. 2 through 5 is shown by the dashed line 36a. The pad 36b actually occupies an actual position shown by the solid line. Similarly, the dashed line 34a illustrates the assigned position for the circuit pad 34b. Both of pads 34b and 36b have been translated in the X direction and in the Y direction with respect to home position 58.

Rotational translation is also possible and that is illustrated in FIG. 7 where dashed line 36c indicates the assigned position of pad 36d. Similarly, dashed line 34c illustrates the assigned position of pad 34d. Both pads are displaced because the circuit of which the pads are a part has been rotated through an angle θ around the home position 58. It is possible that the circuit be rotated relative to the substrate around some point other than the home position. However, it can be demonstrated that rotation through a small angle, less than eight or ten degrees, can be expressed approximately in terms of rotation about a given point, such as the home position, together with a translation in the X direction and a translation in the Y direction from that home position. That fact, coupled with the fact that microelectronic manufacturing processes are such that if part of the printed or integral circuit is displaced all of it is displaced in like degree, makes it possible to express any displacement of the integrated or printed circuit on its substrate in terms of displacement in the X, Y direction relative to a home position and in angular displacement about that home position. While doing that results in some error, that error becomes insignificant in the practical geometry of integrated circuit and semiconductor manufacture.

The discovery of that relationship together with discovery of the relationships that are illustrated in FIG. 8 make the invention possible and very practical. In FIG. 8, an example substrate 70 has been marked off with grid lines 71, 72 and 73 to divide the substrate into four equal columns in the X direction. It has been marked off with horizontal lines 74, 75 and 76 to divide the substrate into four horizontal rows. The result is that the substrate 70 is divided into sixteen grid squares. The upper left-hand corner of the substrate is identified by the reference numeral 80 and it is encircled to indicate that point 80 is the home position. The direction from side to side of the page is called the X direction, and the direction between top and bottom of the page is called the Y direction.

There are five circuit bonding pads on the substrate 70. One of them is numbered 81 and it is located in the second column of squares from home position in the X direction, and in the first row of squares from home position in the Y direction. The assigned position for that circuit pad is illustrated by the dashed box 81a. The circuit pad has been displaced from its intended position by having been rotated through an angle θ. A second circuit pad 82 is found in the fourth row in the X direction, and in the first column in the Y direction. Its assigned position 82a is at the angle θ from the actual position of the pad. In the case of each pair of actual pad positions and assigned positions, an arrow has been drawn to show the direction the bonding tool would need to be moved from the assigned bond position to make a bond at the actual position at the pad. In the case of both of pads 81 and 82, it will be obvious by inspection that the bonding tool must be moved in the Y direction to accomplish the correction, and that virtually no displacement in the X direction is necessary to accomplish the correction. In fact, the X displacement is so small that it can be neglected. It will also be apparent by inspection that the degree of correction in the case of pad 81 is only half the degree of required correction in the case of pad 82, and it will be apparent that that results from the circumstance that pad 82 is twice as far from home position 80 as is pad 81. Further, it will be apparent, since tan θ equals Y correction over X coordinate that the Y correction is closely equal to tan θ time X.

In FIG. 8, circuit pad 83 is located in the first X column and the fourth Y row from home position 80. It has been displaced by angle θ from the intended position for that pad, which is shown in dotted lines 83a. Circuit pad 83 is just as far away from home position 80 as is circuit pad 82 and it has been displaced through the same angle θ. However, to overcome the error in the case of pad 83, the bonding tool is moved primarily in the X direction rather than in the Y direction as in the case of circuit pad 82. Any required correction in the Y direction in moving the tool from position 83a to the position actually occupied by pad 83 is so small that it can be neglected. Again, the displacement is nearly equal to tan θ times Y or, since tan θ nearly equals sin θ, displacement is nearly sin θY.

The box 84a in X column 1 and Y row 2 represents the intended position of circuit pad 84, which is displaced from its intended position by the same angle θ. The arrow that indicates the amount of displacement of pad 84 is only half as long as the arrow that shows the amount of displacement of pad 83. The reason for that is that pad 84 is only half as far away from home position 80 as is pad 83. Further, the displacement is almost entirely in the X direction and has only a negligible component in the Y direction.

A comparison of the direction and the magnitude of the correction required to overcome displacement of pads 81, 82, 83 and 84 makes it clear that the direction in which displacement must take place is determined by whether the displaced pad lies in the X direction or the Y direction from the home position. That conclusion will be verified by an examination of the position of pad 84 in the fourth X column and the fourth Y row. The position that that pad was assigned to occupy is designated by the dashed lines 84a. The two positions are displaced by the same angle θ. The required correction in the X and Y directions are equal in magnitude. It can be demonstrated, and FIG. 8 shows, that the correction required in the X direction is the same in row 4 and column 4 as in row 4 and column 1, and the correction in the Y direction is the same in row 4 and column 4 as in row 1 and column 4. It will also be apparent that the absolute magnitude of the correction is directly proportional to the distance of the pads from home position. It is now possible to draw another conclusion. If the displacement of a pad from its intended position on a substrate relative to a home position on or associated with the substrate is defined in terms of X displacement, Y displacement, and angular displacement in the X, Y plane about the home position, then the displacement due to that angular rotation can be overcome by looking for the pad at an X distance from its intended position substantially proportional to the Y coordinate of the pad and at a Y distance proportional to the X coordinate of the pad. Further, the magnitude of X and Y displacement is nearly equal to tan $\theta$ times Y or X, respectively, when tan $\theta$ or sin $\theta$ is found by measuring displacement angle or by measuring Y displacement near the X axis or X displacement near the Y axis or by calculation from any displacement measurements in X and Y.

It will also be apparent that rigorous mathmatical solution is much simplified if appended to the assumptions that are made in the step of measuring the error at the first point and treating it as the result of translation in X and Y or if appended to the assumption made in both measuring steps.

In addition to that correction to account for rotational displacement, a correction must be applied to account for lineal translation, if any, in the X and Y directions. Accordingly, complete correction is accomplished by correcting both for translation displacement and rotational displacement. The combined correction is applied in a special fashion. In FIG. 8, it was assumed that rotational translation had occured about home position 80. In practice, rotational translation can occur about any point on or off of the grid. If there is a rotational displacement at a point about an axis other than home position, the displacement will appear to be a composite of translational displacement and rotational displacement when viewed from the home position. Because of that, it is possible to divide the mesurement of displacement error into two steps using two different bond points. First, it is assumed that all of the error in the position of a first bond point is translational displacement in the X and Y directions relative to home position. That having been done, and the expected position of the second bond point having been redefined to correct that translational displacement, displacement of the second bond point will appear to be entirely accounted for by rotational displacement about home position. That has not been diagrammed separately in the drawing, partly because a composite drawing tends to become confusing and partly because that circumstance can be envisioned by comparing FIGS. 6 and 7.

It is convenient in making computations of corrections for rotational displacement to arrange the task so that displacement is found by multiplying together the value of a coordinate, a number representing the total degrees or other unit of rotational displacement, and a scale factor representing coordinate error per unit of rotational displacement. The latter is called "factor of X" for Y correction, and "factor of Y" for X correction. In a particular means for practicing the invention, devices for measuring X, Y and $\theta$ may not be available in a form that measures in convenient units. Thus, the factors of X and Y may include other scale changing constants and those other constants may require additional steps of multiplication or division. However, many computational steps are involved, the task of adjusting scale factor is multiplying by the factor of X or Y.

In practicing the process, a point on the workpiece at which no process step other than measurement is to be accomplished is nonetheless called a process point. Further, adding and addition means algebraic addition which includes the arithmatic process of adding and subtracting.

Figure 9:
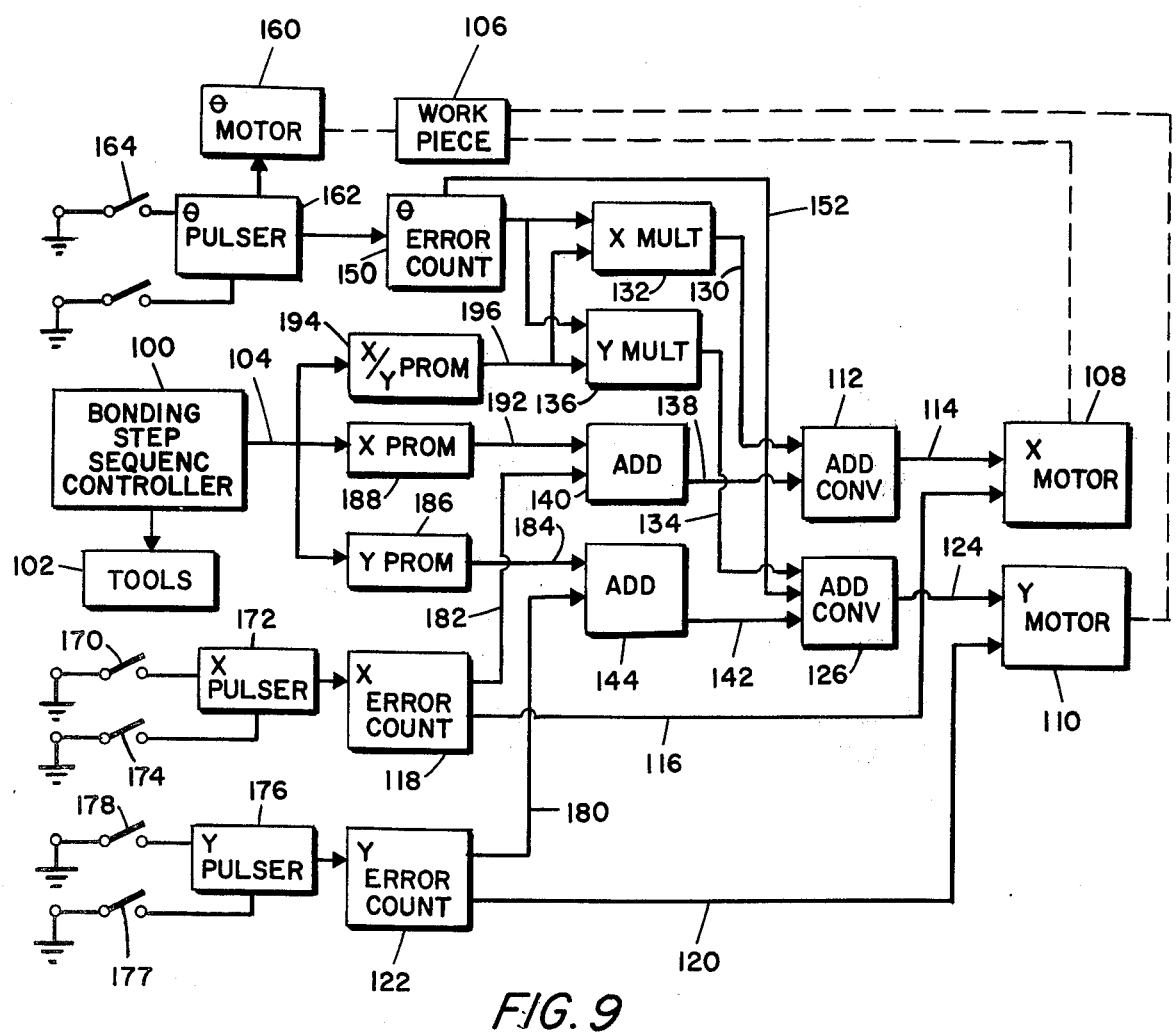
FIG. 9 is a block diagram of an apparatus with which the method may be practiced.

An apparatus by which the process can be practiced is depicted in FIG. 9. Bonding machines that include bonding step sequence controllers wherein a signal is stored or generated which identifies, in sequence, the points at which bonding will be accomplished are well known and need not be described. Bonding tools and wire feed tools are also well known and need not be described here beyond the description already provided. Moreover, the interconnection between the bonding step sequence controller and the set of bonding tools is well defined in the prior art. In FIG. 9, the block numbered 100 and labelled "BONDING STEP SEQUENCE CONTROLLER" represents the movement and tool operation controller of any one of those prior art bonding machines. Output from that controller is supplied to a conventional set of tools 102 and a signal indicating at which of the several welding pads the next operation is to be performed is supplied to output line 104 from the sequence controller where it will serve as an address signal.

The output from the remainder of the apparatus depicted in FIG. 9 is movement of a workpiece 106 in the X direction by rotation of X motor 108 and movement in the Y direction by rotation of Y motor 110. Both of those motors are of the stepping motor variety. They rotate in response to receipt of an input pulse. They rotate in small degree in response to receipt of each pulse whereby their total rotation is a direct measure of the number of pulses received. Each motor receives two input signals, one to define direction of rotation and the other to define the amount of rotation. Motor 108 receives a number of pulses from adder converter 112 which corresponds to a binary number found by addition in that unit. The other signal to the X motor 108 is supplied by line 116 from the X direction error counter 118. A corresponding error direction signal is supplied to Y motor 110 by line 120 from Y error counter 122. A number of pulses is supplied to the Y motor 110 by line 124 from the adder and converter unit 126 which corresponds to a binary number found by addition in the adder portion of unit 126.

There are three inputs to each of the adder converter units 112 and 126. One of the inputs to unit 112 is supplied by line 130 from a multiplier unit 132 labelled "X MULT." A corresponding input is supplied to adder and converter unit 126 by line 134 from a multiplier 136 labelled "Y MULT." A second signal to the adder converter unit 122 is supplied by line 138 from an adder 140. A second signal to the addition and conversion unit 126 is supplied thereto by line 142 from an adder unit 144. A digital signal which identifies the magnitude of angular error is supplied by $\theta$ error count unit 150 to the input of each of the X multiplier 132 and the Y multiplier 136. A second output line from the $\theta$ error count unit 150 applies information about the sign of the error by line 152 to the third input of the adder and converter unit 112 and the adder and converter unit 126.

A stepping motor 160 which appears in the upper left-hand corner of FIG. 9, where it is labelled "$\theta$ MOTOR," is mechanically connected to the workpiece so that the work piece will be rotated in a degree determined by the number of pulses that appear at the output of $\theta$ pulser 162. That pulser also supplies its output to the $\theta$0 error counter 150. When it is desired to rotate the workpiece 106, switch 164 or switch 166 at the input of pulser 162 is closed. Closure of one of the switches results in generation of pulses which are supplied to the motor 160 to rotate the workpiece 106. One switch controls clockwise rotation. The other controls counterclockwise rotation. When the workpiece has been rotated in adequate degree, switch 164 of 166 is opened. The number of pulses generated in θ pulser 162 is counted in the θ error counter 150.

Switches 170 and 174 operate an X pulser 172 whose function is to generate pulses for the period that switch 170 is closed. Which of the two switches is closed indicates whether the output signal furnished by pulser 172 is in the plus X or the minus X direction.

Another pulse generator 176 labelled "Y PULSER" generates pulses during the period when one of control switches 177 and 178 is closed. That pulser supplies a number of pulses to the Y error counter 122 together with information about whether the pulse information supplied to the Y error counter indicates movement in the plus Y direction or in the minus Y direction.

One of the outputs from the Y error counter 122 is supplied by a line 180 to one input of adder 144. Similarly, the output of the X error counter 118 is applied by a line 182 to one of the inputs of the adder unit 140. The other input to adder 144 is applied by line 184 from the unit labelled "Y PROM" and designated 186. That unit is a programmable read-only memory in which the Y coordinate of each of the bonding points is stored. Similarly, the unit 188 marked "X PROM" is a programmable read-only memory in which is stored the digital number corresponding to the X coordinate of each of the bonding points. That number is furnished by the X PROM to the adder 140 by line 192. Unit 199 is a programmable read-only memory in which are stored the products of factors of X and Y times the coordinates of each of the locations at which a bond is to be accomplished. The output from memory unit 194 is supplied by line 196 to the X multiplier unit 132 and to the Y multiplier unit 136.

The signals on line 104 at the output of the bonding step sequence controller are applied as addresses to the three programmable read-only memory units 186, 188 and 194.

In the absence of any error signals at the output of error count units 118, 122 and 150, no error sign signals will be furnished to the X and Y motors 108 and 110 or to the addition and conversion units 112 and 126. Further, because one of the error inputs to the X and Y multipliers is zero, those units supply zero output to the addition and conversion units 112 and 126. Accordingly, as the bonding step sequence controller goes through its step sequence, sending address signals by line 104 to X memory unit 188 and Y memory unit 186, those two memory units supply digital numbers corresponding to the X and Y coordinates of the point identified on the line 104. The X coordinate is supplied to adder 140 and the Y coordinate is supplied to adder 144. There being no error input to those adders, the X coordinate is furnished by adder 140 to adder and converter unit 112 where the coordinate is converted into a number of pulses that will cause the X motor 108 to position the workpiece 106 with that X coordinate under the tool set 102.

There being no error input to adder 144, the output of that adder on line 142 is the digital Y coordinates number supplied by memory unit 186. That same number is supplied by line 142 to the adder and converter unit 126 where it is converted into a number of pulses which causes the Y motor 110 to position the workpiece 106 so that its Y coordinate underlies the tool set 102.

If switch 170 or switch 174 is closed, X pulser 172 will generate pulses for the period that that switch is closed. Those pulses are supplied to X error counter 118 where they are converted to a digital number corresponding to the number of counts received from the X pulser. The output of the error counter 118 is supplied to adder 140. Subsequently, other X coordinate numbers are supplied by the memory unit 188 to adder 140, those coordinate numbers will have the error number added to them. A digital number corresponding to the sum will be applied by line 138 to the adder converter unit 112. The output of that unit will be a number of pulses which corresponds to the sum of the coordinate in memory unit 188 and the magnitude of the error counted in unit 118. Consequently, the X motor 108 will be rotated in a degree that corresponds to the sum of the coordinate and the error. The sum will be found algebraically in view of the signal on the sign line 116.

The Y pulser 176 and the error counter 122 operate in like fashion. When the switch 178 is closed the Y pulser 176 generates pulses which are counted in the Y error counter 122. That unit supplies a digital number corresponding to the magnitude of the error in coordinate units to the adder 144 where it is added to the number that is supplied to the adder by the memory unit 186. The sum of those numbers is applied by line 142 to the adder and converter unit 126. There, they are added and converted to a number of pulses that corresponds to the sum of a Y coordinate and the amount of error in that coordinate. The output of the Y motor is motion of the workpiece 106 in the Y direction in an amount corresponding to the sum of the Y error and the Y coordinate. The number contained in the X error counter and the Y error counter is preserved and is added to each coordinate number furnished by memory units 186 and 188. That corresponds to correction of every coordinate number in the X and Y memory units to account for X and Y translational displacement.

Those error numbers having been put in the X error and the Y error counters, the operator causes the bonding step sequence controller to sequence and to supply the address of the next set of coordinates on line 104. That having been done, the operator closes one or both of switches 164 and 166 to generate pulses in θ pulser 162 for the period of time that the switches are closed. The output of the θ pulser is applied to a motor 160 which rotates in a degree that is directly related to the number of pulses. It rotates the workpiece about the home position. The operator continues to maintain one or the other of the switches closed until the bonding point is centered under the work point seen through the bonder microscope. The number of pulses generated in unit 162 are supplied to the θ error counter 150 where they are converted to a digital number corresponding to the number of counts. That number is supplied to the X multiplier 132 and the Y multiplier 136. There, they are multiplied by the product of the factors of X and Y times coordinate values that are stored in memory unit 194. Both the X multiplier 132 and the Y multiplier 136 include a means for multiplying the X product and the Y product by a scale factor the value of which depends upon the units in which the X coordinates and the Y coordinates are expressed. Those products are supplied to the addition and conversion units 112 and 126 where they are added to the output of adders 140 and 144, respectively. As a consequence, the number of counts supplied by the adder and conversion unit 114 is modified to include the product output from X multiplier 132. The output of addition and conversion unit 124 is modified to include the product output of Y multiplier 136. The motion of workpiece 106 in the X direction will be modified to include the X multiplier output and the motion of the workpiece in the Y direction will be modified to include the Y multiplier output. The θ error count 150 will remain stored in that unit, and like the X error count, and the Y error count, be available for modifying each of the sets of coordinates that are supplied by the memory units as the bonding step sequence controller supplies addresses to line 104.

Although I have shown and described certain specific embodiments of my invention, I am fully aware that many modifications thereof are possible. My invention, therefore, is not to be restricted except insofar as is necessitated by the prior art.

I claim:

1. The method of locating rotationally displaced process points that have preassigned X and Y coordinate positions in an X, Y plane on an electronic device with the aid of a position identifier in the circumstance in which the identifier and the device are capable of relative motion parallel to said X, Y plane, which method includes the steps of:

positioning and orienting the device and the identifier such that the identifier is aligned with a home position on the device;

measuring the amount of relative movement required in the X and the Y directions to move the indentifier from a position over the preassigned X and Y coordinates of a selected bonding point to a position over the actual position of that bonding point;

converting the measurement so made into a representation of the sine or tangent of the angle of rotational displacement; and finding the position of another process point by adding to its preassigned X coordinate an X distance proportional to the product of the preassigned Y coordinate of said other process point and said representation, and by adding to the preassigned Y coordinate of said other bonding point a distance proportional to the product of the preassigned X coordinate of said other process point and said representation.

2. The method defined in claim 1 in which the step of measuring is preceded by the step of measuring the displacement, in the X and Y directions, of a first bonding point from its assigned position; and in which the X and Y coordinates of the preassigned positions of said selected and said other bonding points are altered in X and Y by the amount of said displacement in X and Y, respectively.

3. In the process of moving a processing machine and a workpiece having a plurality of process points on its surface each of which has a preassigned X and Y coordinate position, which method comprises the steps of:

positioning and orienting the device relative to the bonding tool such that the tool overlies a home position on said device;

measuring the difference between the actual position of one of said process points and the position of the intersection of its preassigned X and Y coordinates in terms of X direction difference and Y direction difference;

adding the difference in the X direction and the difference in the Y direction so found to the preassigned X and Y coordinates of a second process point to find a corrected, reassigned X and Y corrdinates for that second process point; and finding the difference between the actual position of said second process point and its reassigned X and Y coordinates.

4. The invention defined in claim 3 in which said second process point is selected to lie substantially in the X direction from said home position whereby the difference between the actual position and the reassigned coordinates of said second process point extends substantially in the Y direction.

5. The invention defined in claim 3 in which said second process point is selected to be substantially in the Y direction from said home position whereby the difference between the actual position and the reassigned coordinates of said second process point extends substantially in the X direction.

6. The invention defined in claim 3 in which said difference between the actual position and the reassigned X and Y coordinates of said second process position is found measuring the amount of relative rotation about said home position to place the actual position of said second process point at said reassigned coordinates.

7. The invention defined in claim 3 which comprises the further step of correcting the preassigned X and Y coordinates of every other process point on said device to find their reassigned positions by adding thereto said X direction difference and said Y direction difference, respectively; and by adding to each redefined position a further correction the amount of which is the product of a function of the angular displacement corresponding to the difference between the actual position of said second process point and of the Y and X coordinates of each of said other process points, respectively.

8. The invention defined in claim 7 in which said function is proportional to the ratio of X direction displacement at a second process point lying substantially on the Y axis through said home position and the Y coordinate of said second process point.

9. The invention defined in claim 7 in which said function is proportional to the degree of rotation about said home position required to accomplish the step of finding the difference between the actual position of said second process point and its reassigned X and Y coordinates.

10. The invention defined in claim 7 in which said function is proportional to the ratio of the Y direction displacement at a second process point lying substantially on the X axis through said home position and the X coordinate of said second process point.

11. For use with a wire bonding machine of the kind that includes a work point indicating means for indicating the work point at which the bonding tool will effect bonding on a workpiece and further includes means for producing relative movement in X and Y directions in the plane of said workpiece between the tool and workpiece automatically such that the tool is moved in predefined sequence to each of a number of process points on the workpiece the position of which process points is defined in terms of a home position on the workpiece:

means for moving the workpiece relative to said work point to bring the point designated home position under the indicating means and for orienting the workpiece with its X direction parallel to said X direction of relative movement;

means for moving the workpiece relative to said work point to place the assigned position of one of said process points under said work point;

measuring means for measuring the displacement of said one process point from said work point;

means for altering the preassigned position of a second one of said process points by the amount of said displacement; and means for measuring the displacement of said second one of said process points from its reassigned position.

12. The invention defined in claim 11 which further comprises means for altering the preassigned position of others of said process points by the amount of displacement found between the position of the first process point and its preassigned position to find their respective reassigned positions; and means for adding to the reassigned position of each of said other process points a further correction which is a function of the degree of rotation about said home position of said second process point to place said second process point at its reassigned position.

13. The invention defined in claim 11 in which the means for measuring the displacement of the second process point from its reassigned position comprises means for rotating the workpiece about said home position.

14. The invention defined in claim 11 in which the means for measuring the displacement of the second process point from a reassigned position comprises means for measuring that displacement in terms of at least one of the X and Y directions.

* * * * *